Aug. 11, 1931.  H. W. MEADE  1,818,079
AUTOMATIC SPARK CONTROL
Filed Jan. 5, 1929
Fig.1.
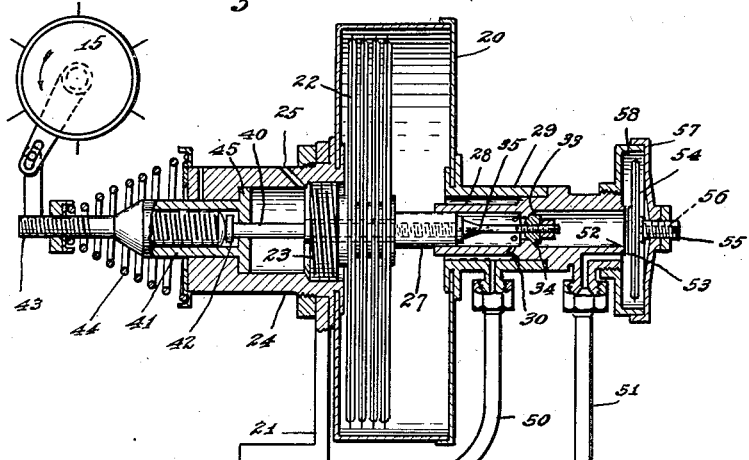
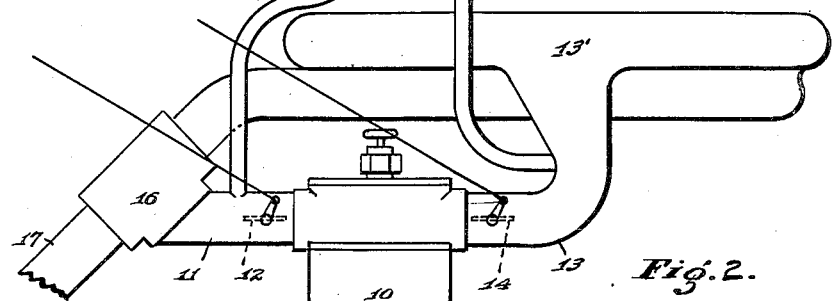
Fig.2.
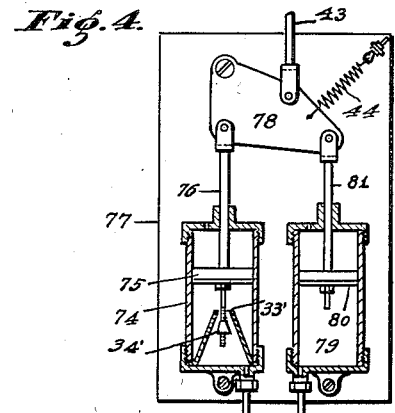
Fig.4.
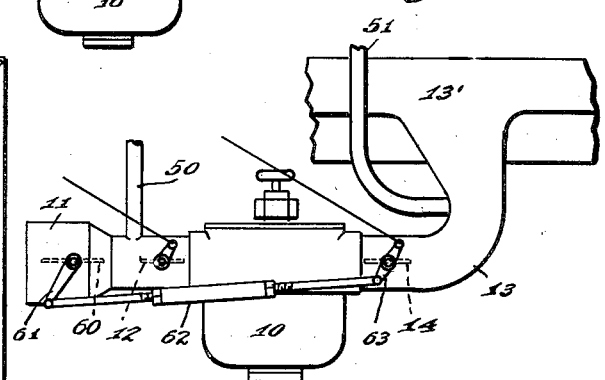
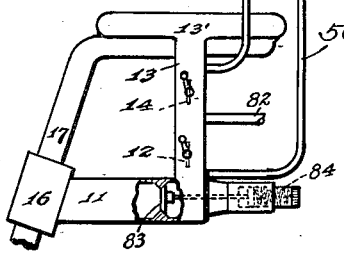
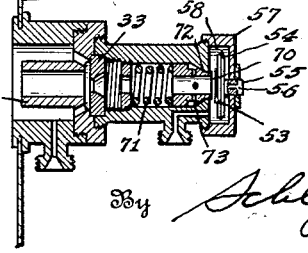
Fig.3.
Inventor
HAROLD W. MEADE,
By Ashley Trask
Attorneys Patented Aug. 11, 1931

1,818,079

UNITED STATES PATENT OFFICE

HAROLD W. MEADE, OF YEDDO, INDIANA

AUTOMATIC SPARK CONTROL

Application filed January 5, 1929. Serial No. 330,456.

This application is a substitute for and in large part a continuation of my prior application, Serial No. 156,611, filed December 23, 1926.

It is the object of my invention to produce a device for use in automatically controlling the spark advance in an internal combustion engine. More specifically, it is my object to produce an automatic control device which will retard the spark when the motor is idling or when the engine is being started, which will advance the spark as the engine speed increases, and will retard the spark when the load on the engine becomes great enough to decrease the engine speed to a point where knocking would result if the spark was to be fully advanced. Further, it is my object to produce such a device which is free from mechanical connection with any moving parts of the carbureter or associated mechanism.

Broadly speaking, I accomplish the desired objects by the use of one or more pressure-responsive devices which regulate the degree of spark advance under the joint control of pressures at spaced points in the inlet conduit of the engine. In the preferred form of my invention, I accomplish my object by providing a by-pass around the throttle valve of the engine, and in this by-pass I provide a pressure-responsive device which is operatively connected to the engine timer in order to control the degree of spark-advance. In addition, I preferably provide a valve which will be closed when the pressure in the air conduit outside the throttle is at or below a predetermined minimum value, and I so adjust this valve that it prevents the vacuum in the mixture conduit on the engine side of the throttle valve from advancing the spark when the engine is being started. My device may also be provided with a pressure-controlled valve which will be closed when the pressure on the engine side of the throttle drops below a predetermined minimum, and which when closed will prevent the suction in the intake manifold from producing an advance of the spark. My device in its preferred form also includes a valve which regulates the flow of air through the by-pass and thus modifies the pressure which controls the spark advance.

The accompanying drawings illustrate my invention: Fig. 1 is a longitudinal section through the preferred form of my device showing its construction and its manner of connection to the timer and to the air and mixture passages of the engine, the timer and the engine carbureter being illustrated somewhat diagrammatically; Fig. 2 is a side elevation of the conduit through which air is supplied to the carbureter, this view illustrating a means which I may employ to produce a slight decrease in pressure in the air conduit outside the throttle; Fig. 3 is a fragmental section illustrating a modification of the idle control shown in Fig. 1; and Fig. 4 illustrates a modification in which two pressure-responsive elements are employed.

For simplicity of illustration and because my invention is not concerned with the details of such parts, the drawings present a mere diagrammatic showing of the timer and of the carbureter and its associated parts. The carbureter 10 may be of any desired type. It is provided with an air-supply conduit 11 having a choke-valve 12, a mixture-discharge conduit 13 leading to the engine or intake manifold 13' thereof, and a throttle 14 in such mixture-discharge conduit. The timer, like the carbureter, may be of any desired construction and includes a casing or other part 15 which may be shifted in the direction of the arrow to effect an advance of the spark. The air-supply conduit may, if desired, be connected to a stove 16 surrounding the exhaust pipe 17 of the engine.

My spark-control device comprises a hollow airtight casing 20 which may be supported on a suitable bracket 21 by means of which the device may be readily attached to an engine. Mounted within the casing 20 are one or more pressure-responsive wafers 22. Preferably I employ a series of such wafers as shown in the drawing and connect them together so that their interiors communicate with each other and with the atmosphere. This may readily be accomplished by mounting the end one of the wafers on a plug 23 which is screw-threadedly mounted on a cup 24. The cup 24 is attached to one wall of the casing 20 and has through its wall an opening 25 to communicate with the atmosphere. The plug 23 is provided with an axial hole by which communication is effected between the interior of the cup 24 and interior of the wafers 22.

The free end of the pressure-responsive element 22 is connected to a guide 27 which is axially slidable in the bore of a sleeve 28. The sleeve 28 may conveniently be screw-threadedly mounted in a bushing 29 supported from the wall of the casing 20. For a portion of its length, the sleeve 28 is radially spaced from the inner wall of the bushing 29, the annular space thus formed communicating with the chamber 20, and through openings 30, with the interior of the sleeve 28. Located at an intermediate point within the sleeve 28 is a valve seat 33 with which co-operates a valve 34 mounted on a valve stem 35 which is attached to and movable with the guide 27.

Extending through the axial hole in the plug 23 and through the central holes in the wafers 22 is a rod 40 which is rigidly connected at one end to the guide 27. The opposite end of the rod 40 extends through the bottom of a cup 41 and is provided within such cup with a head 42. The cup 41 is slidably mounted in the bottom of the stationary cup 24 and has attached to it a member 43 which is connected to the casing 14 of the timer. A spring 44 acts between the stationary cup 24 and the member 43 and tends to hold the member 43 outward to retard the spark. Outward movement of the sliding cup 41 and member 43 under the force exerted by the spring 44 is limited as by means of a flange 45 which is integral with the sliding cup 41 and is adapted to engage the bottom of the stationary cup 24.

The head 42 on the rod 40 is so located that it will be spaced from the bottom of the sliding cup 41 when the pressure-responsive element 22 is completely collapsed, the lost-motion connection thus effected making it possible for the pressure-responsive element 22 to expand slightly before its expansion is opposed by the spring 44.

The interior of the casing 20 is connected by means of a pipe or tube 50 with the air conduit 11 at a point outside of the choke valve 12. Because of the openings 30, the bore of the sleeve 28 on one side of the valve seat 33 is also connected through the tube 50 with the air conduit 11. The bore of the sleeve 28 on the opposite side of the valve seat 33 is connected through a tube 51 with the mixture-discharge conduit or with the intake manifold of the engine at a point on the engine side of the throttle 14.

Desirably there is provided in this last named connection a valve which will be closed when the pressure on the engine side of the throttle drops below a predetermined minimum. To this end, I preferably form a valve seat 52 on the end of the sleeve 28. With this valve seat there co-operates a valve 53 which is carried by a pressure-responsive wafer 54. The wafer 54 may be mounted on the inner end of a screw plug 55 which is provided with an axial hole 56 through which the interior of the wafer communicates with the atmosphere. The plug 55 is conveniently mounted in the cover 57 of the chamber 58 the interior of which communicates with the tube 51.

My invention is illustrated in the drawings with the parts in the position which they assume when the engine is not running. It will be noted that the valve 34 is closed thus preventing communication between the interior of the casing 20 and the intake manifold of the engine. During the cranking of the engine, there occurs a flow of air through the carbureter and its associated passages, and this air flow produces a progressive pressure drop throughout the length of the air passage 11 and the mixture-discharge passage 13. As cranking speeds are usually relatively slow, the drop in pressure at the point where the tube 50 connects with the passage 11 is relatively slight and is insufficient to produce any expansion of the pressure-responsive element 22. If the choke valve 12 is closed or partially closed during starting, the drop in pressure within the casing 20 is even less than it is when the choke valve is open. Because the drop in pressure during cranking is insufficient to cause expansion of the pressure-responsive element 22 the spark remains retarded.

When the engine begins to run the velocity of the air flow through the air-supply conduit 11 is increased and produces a consequent increase in the pressure drop throughout its entire length. In many automobiles, air passes through the stove or heating device 16 before entering the air-supply conduit 11, and in such construction a sufficient pressure drop is obtained at the mouth of the tube 50 to produce expansion of the pressure-responsive element and opening of the valve 34. If the air-supply conduit 11 is not connected to a heating device or is so short that the pressure drop at the mouth of the tube 50 is inconsiderable, I may provide the air-supply conduit with a device which will be hereinafter described and which will produce a sufficient drop of pressure within the casing 20 to provide for opening of the valve 34.

When the valve 34 is open, air flows from the air-supply conduit 11 through the tube 50 into the bore of the sleeve 28, and through the tube 51 to the intake manifold. The amount of air thus flowing is relatively small and does not affect materially the proportions of the mixture supplied to the engine. As long as the valve 34 is open, this flow of air continues, and the pressure within the casing 20 is somewhere between the pressure at the mouth of the tube 50 and that at the mouth of the tube 51. This pressure is always less than the atmospheric pressure to which the interior of the wafers 22 is subjected and hence tends to expand such wafers, the expansive effect being opposed by the elasticity of the wafers and by the force exerted by the spring 44. These latter factors are so regulated that the spark is substantially fully advanced whenever the engine is running at a speed greater than idling speed and is not subjected to an excessive load. As the throttle 14 is opened, the pressure within the intake manifold increases and produces a corresponding increase in the pressure along the air passage through the tube 50, sleeve 28, and the tube 51; but this increase in pressure does not become sufficient to retard the spark until the engine speed falls off under increased load to a point where the engine would knock if the spark were fully advanced.

The engine will run satisfactorily with an advanced spark under a wide variety of speeds and loads which produce considerable variation in the vacuum in the intake manifold. It is therefore desirable that some means be embodied in my device which will prevent the pressure-responsive element 22 from responding directly to changes in the intake manifold vacuum. To this end, my device is so arranged that the effect of the intake manifold vacuum on the pressure-responsive element is varied as the manifold vacuum changes.

To accomplish this result, I may make the valve stem 35 of the general form shown in Fig. 1 so that as the pressure-responsive element 22 expands and the valve stem moves to the right the air flow through the bore of the sleeve 28 will be retarded. As a result of this, the pressure within the casing 20 is higher than it would be if the air flow through the bore of the sleeve 28 were unobstructed.

The idle control device which has been above described and which prevents a complete advance of the spark under the influence of the high vacuum which exists in the intake manifold while the engine is idle may or may not be embodied in my device as conditions may warrant. If it is embodied, the plug 55 is adjusted so that the valve 53 will engage the valve seat 52 when a high intake manifold vacuum exists as a result of idling. Closure of the valve 53 prevents air flow through the tube 51 and through the bore of the sleeve 28 and thus renders the pressure-responsive element 22 responsive to the pressure at the mouth of the tube 50. This pressure is never more than enough to produce a slight expansion of the wafers 22 if the throttle is nearly closed, and the spark in therefore retarded until the pressure in the intake manifold rises to a point sufficiently high to permit the collapse of the wafer 54 and the opening of the valve 53.

I have referred above to a means which I may employ to insure that the drop in pressure at the mouth of the tube 50 when the engine begins to run will be sufficient to produce opening of the valve 34. An adjustable means of this kind is illustrated in Fig. 2 in which the air supply conduit 11 is shown as provided at a point outside the choke valve 12 with another valve 60 controlled by a lever 61 which is connected through a link 62 with a lever 63 carried by the shaft of the throttle valve 14. The cross-sectional area of the conduit 11 in the vicinity of the valve 60 is desirably greater than that in the vicinity of the throttle 14, and the lengths of the arms 61 and 63 are such that the valve 60 will open faster than does the throttle. When the throttle is closed or nearly closed, as it normally is during cranking of the engine, the valve 60 will be closed sufficiently far to impede slightly the flow of air through the air supply conduit and thus to produce a drop in pressure at the mouth of the tube 50. The valve 60 does not close far enough to impede the flow of air to such an extent that carburation is interfered with. As the throttle is opened, the valve 60 opens faster than the throttle, and thus insures that the flow of mixture to the engine will be determined by the throttle position and not by the position of the valve 60.

The idle control device which has been described above and which operates to retard the spark when the engine is idling may be supplemented by the mechanism illustrated in Fig. 3. In this construction, the valve-seat 70, which co-operates with the valve 53, is made axially slidable against the pressure of a spring 71 which serves normally to hold the valve-seat in position against an air-tight conical shoulder 72. The shoulder and valve-seat are so shaped that when the valve-seat recedes from engagement with the shoulder an annular air-passage is formed communicating with the interior of the chamber 58. This construction operates in substantially the same manner as does the idle control device illustrated in Fig. 1 except when the throttle is closed and the engine is running at greater than idling speed, as occurs when the engine is used as a brake. The excessively high vacuum existing under these conditions reduces the pressure within the chamber 58 to such an extent that atmospheric pressure within the pressure responsive element 54 overcomes the pressure of the spring 71 and the valve-seat 70 is moved inward to provide an air passage through the interior of the sleeve 28, through radial holes 73 in the side wall of the valve seat 70, and past the shoulder 72, thus subjecting the pressure-responsive element 22 to the manifold vacuum and advancing the spark.

The embodiment of my invention which has just been described consists of a single pressure-responsive element which is responsive to a pressure obtained by modifying the pressure at a point in the inlet supply passage of the engine. I can accomplish substantially the same ultimate result by arranging a pressure-responsive element to be directly responsive to an unmodified pressure and then modifying the effect which this pressure-responsive element has on the timer. Such a construction is illustrated in Fig. 4.

This device embodies two separate pressure-responsive elements, one of which is responsive to pressures above the throttle, and the other of which is responsive to pressures below the throttle. The former of these pressure-responsive elements comprises a cylinder 74 in which is slidably mounted a piston 75 carried by a piston rod 76. This pressure-responsive element corresponds to the element 22 in the structure shown in Fig. 1. A valve 34' carried by the lower end of the piston rod 76 co-operates with a valve seat 33', these two parts having the same function as the valve seat 33 and valve 34 of the structure shown in Fig. 1.

At its base, the cylinder 74 is pivotally mounted on a suitable support 77. The piston rod 76 extends upward from the cylinder 74 and is connected to a plate 78 which also is pivotally mounted on the support 77. The interior of the cylinder 74, below the piston and below the valve seat 33', communicates with the tube 51 connected to the inlet manifold above the throttle 14.

A second pressure-responsive element comprises the cylinder 79, piston 80, and piston rod 81. The cylinder 80 is pivotally attached to the support 77 at its base, and the end of the piston rod 81 is connected to the pivoted lever or plate 78. The space below the piston communicates with the tube 50, which is connected to the air-inlet conduit 11 outside of the check valve.

At some point on the plate 78 depending upon the circumstances, the rod 43 is attached, this rod leading to the timer as in the structure shown in Fig. 1. Clockwise rotation of the plate 78 advances the spark, and counterclockwise rotation retards it.

A spring 44' corresponds in function with the spring 44 and the elasticity of the wafers 22 of the structure shown in Fig. 1, and tends to move the plate 78 to retard the spark.

Desirably, the point at which the piston rod 76 is connected to the plate 78 is angularly displaced in a clockwise direction about the axis of pivotal mounting of the plate 78 from the point at which the piston rod 81 is attached to the plate. Further, the rod 76 is disposed at a lesser distance from the axis of pivotal mounting of the plate 78 than is the other piston rod 81. The net result of this is that the force exerted on the plate 78 by the piston rod 81 has a greater lever arm than has the force exerted by the piston rod 76. Further, the effect of having the rod 76 attached to the plate 78 at a point displaced in a clockwise direction from the point of attachment of the arm 81 is that the effective lever-arm of the force exerted by the rod 76 decreases at a more rapid rate than does that of the force exerted by the rod 81. I have found it desirable to arrange the parts so that the effective lever-arm of the force exerted by the rod 76 is zero, or substantially so, when the spark is fully advanced.

In Fig. 4 I have illustrated a type of mixture-supplying device different from the ordinary type of carbureter. This device comprises a conduit 82 connected at one end to the intake manifold 13 below the throttle 14 and connected at the other end to a mixture-producing device supplying an overly rich mixture. The overly rich mixture supplied by the conduit 82 is diluted with air admitted through the air inlet conduit 11 past a valve 83, this valve being loaded, as by a spring 84. The usual choke valve 12 is located between the valve 83 and the point at which the conduit 82 joins the manifold 13.

This device operates to provide substantially the same automatic spark control as is provided by the structure illustrated in Fig. 1. When the engine is at rest, the spring 44' serves to move the plate 78 to its limit of movement in a counter-clockwise direction, thus retarding the spark. Under these circumstances, the valve 34' is closed, thus preventing downward movement of the piston 75 under the influence of any reduced pressure in the intake manifold 13. When the engine is being cranked to start it, the reduction in pressure at the inlet of the pipe 50 is insufficient to cause downward movement of the piston 80 against the force exerted by the spring 44'. As a result, the valve 34' remains closed, and the spark retarded.

When the engine is started and begins to operate under its own power, the drop in pressure at the mouth of the tube 50 becomes sufficient to cause the piston 80 to move downward, thus opening the valve 34'. After the valve 34' is opened, the position of the plate 78, and therefore the degree of spark advance, depends upon the joint effect of the respective pressures at the mouths of the tubes 50 and 51. As the pressure above the throttle 14 decreases, the force tending to depress the piston 75 and the piston rod 76 is increased; but as the spark advances under this action, the comparative effect of the pressure above the throttle is decreased by reason of the shortening of the effective lever-arm of the force exerted on the plate 78 by the rod 76. In other words, while the position of the plate 78 is determined jointly by the pressure at the mouth of the tube 50 and by the pressure at the mouth of the tube 51, the proportionate effect exercised by the pressure at the mouth of the tube 51 decreases as such pressure decreases. If the parts are arranged as illustrated in Fig. 4, the lever arm of the force exerted by the rod 76 on the plate 78 is zero, and the spark is held advanced against the force exerted by the spring 44' by reduced pressure at the mouth of the tube 50.

My device operates without mechanical connection to any moving part of the carbureter or associated mechanism, and its installation is thereby facilitated. Regulation of the spark occurs as a result of the joint effect of the pressures at two points spaced along the inlet conduit of the engine; the proportionate part which each pressure plays in the ultimate result varying with changes in the pressures. This variation can be accomplished in various ways, it being obtained in the structure shown in Fig. 1 by modifying the pressure to which the single pressure-responsive element is responsive and in the structure shown in Fig. 4 by modifying the effect produced on the timer by movements of a pressure-responsive device.

It may be noted that my device will operate satisfactorily under varying atmospheric pressures, and therefore at varying altitudes.

I claim as my invention:

1. In combination with an internal combustion engine having a timer adjustable to control the degree of spark advance, said engine also having a carbureter provided with the usual throttle, a conduit forming a by-pass around said throttle, a valve for regulating flow through said by-pass, and pressure-responsive means responsive to the pressure at a point between said valve and the inlet opening of said by-pass, said pressure-responsive means being operatively connected to said timer to advance the spark as the pressure to which said pressure-responsive means is subjected decreases, said valve being connected to said pressure-responsive means so that it will operate to decrease flow through said by-pass as said pressure-responsive means responds to a decreased pressure.

2. In combination with an internal combustion engine having a timer adjustable to control the degree of spark advance, said engine also having a carbureter provided with the usual throttle, a conduit forming a by-pass around said throttle valve, a valve for regulating flow through said conduit, pressure-responsive means responsive to the pressure at a point between said valve and the inlet opening of said by-pass, said pressure-responsive means being operatively connected to said timer to advance the spark as the pressure to which said pressure-responsive means is subjected decreases, and means for operating said valve to decrease flow through said by-pass as the pressure at the outlet of said by-pass decreases.

3. In combination with an internal combustion engine having a timer adjustable to control the degree of spark advance, said engine also having a carbureter provided with the usual throttle, a conduit forming a by-pass around said throttle, a valve for regulating flow through said by-pass, pressure-responsive means responsive to the pressure at a point between said valve and the inlet opening of said by-pass, said pressure-responsive means being operatively connected to said timer to advance the spark as the pressure to which said pressure-responsive means is subjected decreases, and means operative after said engine has been at rest for preventing flow through said by-pass until a predetermined pressure-drop has occurred at the inlet of said by-pass.

4. In combination with an internal combustion engine, a conduit for supplying explosive mixture thereto, a throttle in said conduit, a pressure-responsive device connected to said conduit between the engine and said throttle, a timer controlled by said pressure-responsive device, and means for decreasing the effect on the pressure-responsive device of the pressure between the engine and said throttle as such pressure is decreased.

5. In combination with an internal combustion engine, a conduit for supplying explosive mixture thereto, a throttle in said conduit, a pressure-responsive device connected to said conduit between the engine and said throttle, a timer controlled by said pressure-responsive device, and means for rendering said pressure-responsive element inoperative to advance the spark while the engine is being cranked.

6. In combination with an internal combustion engine, a conduit for supplying explosive mixture thereto, a throttle in said conduit, a pressure-responsive device connected to said conduit between the engine and said throttle, a timer controlled by said pressure-responsive device, and means for rendering said pressure-responsive element inoperative to advance the spark until a predetermined pressure drop has been reached or exceeded at a point between said throttle and the inlet of said conduit.

7. In combination with an internal combustion engine, a conduit for supplying explosive mixture thereto, a throttle in said conduit, a pressure-responsive device connected to said conduit between the engine and said throttle and normally operative to advance the spark upon decrease in the pressure within said conduit, a timer controlled by said pressure-responsive device, and means for rendering said pressure-responsive device inoperative to advance the spark when the pressure in the mixture conduit between the throttle and the engine reaches or drops below a predetermined value.

8. In combination with an internal combustion engine, a conduit for supplying explosive mixture thereto, a throttle in said conduit, a pressure-responsive device connected to said conduit between the engine and said throttle, a timer controlled by said pressure-responsive device, said conduit being provided between its inlet and said throttle with a choke-valve, and means for rendering said pressure-responsive element inoperative to advance the spark until a predetermined pressure drop has been reached or exceeded at a point between said choke-valve and the inlet of said conduit.

9. In combination with an internal combustion engine, a conduit for supplying explosive mixture thereto, a throttle in said conduit, a pressure-responsive device connected to said conduit between the engine and said throttle, a timer controlled by said pressure-responsive device, said conduit being provided between its inlet and said throttle with means offering a resistance to flow through said conduit, and means for rendering said pressure-responsive device inoperative to advance the spark until a predetermined pressure drop has been reached or exceeded at a point between said throttle and said flow-resisting means.

10. The combination set forth in claim 9 with the addition that said flow-resisting means is adjustable and is connected to said throttle as to offer a decreasing resistance to flow as said throttle is opened.

11. In combination with an internal combustion engine, a conduit for supplying explosive mixture thereto, a throttle in said conduit, a pressure-responsive device connected to said conduit between the engine and said throttle, a timer controlled by said pressure-responsive device, and means affected by the pressure existing in said conduit between the inlet thereof and said throttle for modifying the effect on said pressure-responsive device of the fluid pressure existing between the engine and said throttle.

12. In combination with an internal combustion engine, a conduit for supplying explosive mixture thereto, a throttle in said conduit, a pressure-responsive device connected to said conduit between the engine and said throttle, a timer controlled by said pressure-responsive device, and means affected by the pressure existing in said conduit between the inlet thereof and said throttle for modifying the effect on said timer of the fluid pressure existing between the engine and said throttle.

13. In combination with an internal combustion engine, an air and fuel supply conduit therefor, a throttle valve in said conduit, a choke valve in said conduit, a timer, and timer-regulating means controlled jointly by the pressures existing respectively in said conduit between the throttle and the engine and between the conduit inlet and the choke valve.

14. In combination with an internal combustion engine, a conduit for supplying explosive mixture thereto, a throttle in said conduit, a pressure-responsive device connected to said conduit between the engine and said throttle, a timer controlled by said pressure-responsive device, and pressure-affected means for decreasing the effect on said pressure-responsive device of fluid-pressure changes occurring between the engine and said throttle as the pressure between the engine and throttle decreases.

15. In combination with an internal combustion engine, a conduit for supplying explosive mixture thereto, a throttle in said conduit, a pressure-responsive device connected to said conduit between the engine and said throttle, a timer controlled by said pressure-responsive device, and pressure-affected means for decreasing the effect on said timer of fluid-pressure changes occurring between the engine and said throttle as the pressure between the engine and the throttle decreases.

16. In combination with an internal combustion engine, a timer for said engine, automatic control means for said timer, and means for rendering said timer control means inoperative to advance the spark while the engine is being cranked.

17. In combination with an internal combustion engine, a conduit for supplying air and fuel thereto, a timer, automatic control mechanism for said timer, yielding means opposing operation of said control mechanism, and means for rendering said timer-control mechanism inoperative to advance the spark until a predetermined pressure drop has been reached or exceeded at a point in said conduit.

18. The invention set forth in claim 17 with the addition that said timer-control means includes a pressure-responsive element connected to said conduit.

19. The invention set forth in claim 17 with the addition of a choke-valve in said conduit, said timer control means including a pressure-responsive element connected to said conduit between said choke-valve and the engine.

In witness whereof, I have hereunto set my hand at Cates, Indiana, this 24 day of December, A. D. one thousand nine hundred and twenty eight.

HAROLD W. MEADE.